(12) United States Patent
Zhu et al.

(10) Patent No.: US 11,330,270 B2
(45) Date of Patent: May 10, 2022

(54) TEMPORAL DOMAIN RATE DISTORTION OPTIMIZATION CONSIDERING CODING-MODE ADAPTIVE DISTORTION PROPAGATION

(71) Applicant: University of Electronic Science and Technology of China, Chengdu (CN)

(72) Inventors: Ce Zhu, Chengdu (CN); Lingling Deng, Chengdu (CN); Ni Jiang, Chengdu (CN); Qiuyue Wang, Chengdu (CN); Keke Ding, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/412,292

(22) Filed: Aug. 26, 2021

(65) Prior Publication Data

US 2022/0007031 A1 Jan. 6, 2022

Related U.S. Application Data

(63) Continuation of application No. PCT/CN2020/132812, filed on Nov. 30, 2020.

(30) Foreign Application Priority Data

Mar. 31, 2020 (CN) .......................... 202010241861.4

(51) Int. Cl.
*H04N 19/147* (2014.01)
*H04N 19/109* (2014.01)
(Continued)

(52) U.S. Cl.
CPC ......... *H04N 19/147* (2014.11); *H04N 19/109* (2014.11); *H04N 19/172* (2014.11); *H04N 19/567* (2014.11)

(58) Field of Classification Search
CPC .. H04N 19/147; H04N 19/109; H04N 19/172; H04N 19/567; H04N 19/51
See application file for complete search history.

(56) References Cited

U.S. PATENT DOCUMENTS

2012/0177109 A1\* 7/2012 Ye .......................... H04N 19/19
375/240.03

FOREIGN PATENT DOCUMENTS

| CN | 104796705 A | 7/2015 |
| CN | 105120282 A | 12/2015 |

(Continued)

OTHER PUBLICATIONS

Yanbo Gao, et al., Hierarchical Temporal Dependent Rate-Distortion Optimization for Low-Delay Coding, 2016, pp. 570-573, 2016 IEEE.

*Primary Examiner* — Tracy Y. Li
(74) *Attorney, Agent, or Firm* — Bayramoglu Law Offices LLC

(57) ABSTRACT

A temporal domain rate distortion optimization considering a coding-mode adaptive distortion propagation is provided. A problem of dependency rate distortion optimization based on a temporal domain distortion propagation is induced again according to a temporal domain dependency relationship under an LD structure and a distortion propagation analysis under a skip mode and an inter mode; and an aggregation distortion of a current coding unit and an affected future coding unit are estimated and a propagation factor of a coding unit in a temporal domain distortion propagation model is calculated by constructing a time propagation chain, wherein a Lagrange multiplier is adjusted through an accurate propagation factor to realize a temporal domain dependency rate distortion optimization, and an I frame is subjected to a secondary coding technology to realize the temporal domain dependency rate distortion optimization of the I frame.

1 Claim, 2 Drawing Sheets

(51) Int. Cl.
*H04N 19/172* (2014.01)
*H04N 19/567* (2014.01)

(56) References Cited

FOREIGN PATENT DOCUMENTS

| | | | | |
|---|---|---|---|---|
| CN | 105872544 A | 8/2016 | | |
| CN | 111314703 A | 6/2020 | | |
| KR | 20050061762 A | * | 6/2005 | ............ H04N 19/11 |
| WO | WO-2007010690 A1 | * | 1/2007 | ............ G06T 9/004 |

* cited by examiner

TEMPORAL DOMAIN RATE DISTORTION OPTIMIZATION CONSIDERING CODING-MODE ADAPTIVE DISTORTION PROPAGATION

CROSS REFERENCE TO THE RELATED APPLICATIONS

This application is a continuation application of International Application No. PCT/CN2020/132812, filed on Nov. 30, 2021, which is based upon and claims priority to Chinese Patent Application No. 202010241861.4, filed on Mar. 31, 2020, the entire contents of which are incorporated herein by reference.

TECHNICAL FIELD

The present invention belongs to the technical field of video coding and decoding, and in particular, relates to temporal domain rate distortion optimization considering coding-mode adaptive distortion propagation.

BACKGROUND

Rate distortion theory is the basic theory of lossy coding. The rate distortion optimization (RDO) technology developed based on this theory is one of the important tools to improve the coding efficiency, and has been widely applied in the field of video coding.

The performance of the video coding needs to be measured by coding bit and reconstruction distortion. On one hand, when we want higher video quality, the coding bit of the video will be increased; and on the other hand, at the lower coding bit level, the distortion of the video will be greatly increased, so there is a mutually contradictory and mutually constrained relationship between the coding bit and the reconstruction distortion. The rate distortion optimization technology is to make the encoder to select one group of optimal coding parameter set, so that the coding distortion is minimum on the premise that the coding bit is less than a target bit, and the mathematical expression is shown in a formula (1.1):

$$\min \sum_{i=1}^{N} D_i \text{ s.t.} \sum_{i=1}^{N} R_i \leq R_c \quad (1.1)$$

wherein $D_i$ and $R_i$ represent the distortion and bit number of the coding unit, N is a total number of the coding units, and $R_c$ represents the target bit number.

In order to solve the above restrictive rate distortion optimization problem, the global Lagrange multiplier $\lambda_g$ may be introduced to transform the constrained problem into an unconstrained problem of a formula (1.2), wherein J is called a rate distortion cost function.

$$\min J \quad J = \left\{ \sum_{i=1}^{N} D_i + \lambda_S \sum_{i=1}^{N} R_i \right\} \quad (1.2)$$

FIG. 1 shows a classic R-D curve. When the video is coded by one group of coding parameters, distortion and code rate under the condition of the coding parameter may be obtained. We draw (R,D) combinations under different coding parameters in the form of points, and these points are called actual rate distortion operable points. We may observed that for the given rate Rx, an operable point with the smallest D can be always found, these points are called the optimal operable points which may be actually achieved, these optimal operable points are connected, and an actually operable R-D curve may be obtained.

Under the condition of independent rate distortion optimization, that is, the rate distortion performance between different coding units is mutually independent, the formula (1.2) is derived with respect to R to obtain $\lambda_g = \partial D_i / \partial R_i$. It can be seen that $\lambda_g$ is a negative slope of a certain point on a rate distortion curve, the larger $\lambda_g$ corresponds to an operation point with a smaller code rate and larger distortion, the smaller $\lambda_g$ corresponds to a larger code rate, and the operable point with smaller distortion is the most important determining factor affecting the rate distortion performance, therefore, it is very important to select the Lagrange multiplier $\lambda_g$. The size of $\lambda_g$ in a current VVC is mainly determined by a preset quantization parameter (QP) and is irrelevant to an input video sequence.

However, since intra-frame/inter-frame will introduce dependency among different coding units, and using the independent rate distortion optimization technology for each coding unit cannot achieve the optimal coding performance. Therefore, a global rate distortion optimization method with acceptable complexity is required to further improve the coding efficiency.

A temporal domain rate distortion optimization algorithm under an LD coding structure is studied in the literature temporally dependent rate-distortion optimization for low-delay hierarchical video coding. According to the time dependent relationship under the LD configuration, a temporal domain distortion propagation chain under multiple reference frames is established, the distortion propagation degree is estimated, and the propagation factor is calculated, so that the global Lagrange multiplier is adjusted according to the aggregation propagation factor, thereby realizing temporal domain rate distortion optimization and solving the problem about the global rate distortion optimization.

FIG. 2 shows a method for constructing a temporal domain distortion propagation chain under an LD coding structure. Due to the adoption of a multi-reference frame coding method, one coding block in a key frame may directly affect a plurality of blocks in the subsequent different frames and continue to extend forward indirectly. Therefore, a large number of experiments are required to figure out the utilization rate of each reference frame in the GOP, and a plurality of possible influence blocks are subjected to weighing average to calculate the expected distortion of the subsequent coding block. The affected coding block in the subsequent frame may be determined on the basis of the temporal domain dependent relationship under the LD coding structure in FIG. 3 and by adopting forward motion search.

When the temporal domain rate distortion optimization of the coding unit $B_i$ in the key frame $f_i$ is considered under the LD coding structure, the expected distortion of the affected coding unit $B_{i+1}$ in the coding frame $f_{i+1}$ is:

$$E(D_{i+1}) = P_{i,i+1} \cdot D_{i+1}(o_i, o_{i+1}^1) + P_{i-4,i+1} \cdot D_{i+1}(o_{i-4}, o_{i+1}^2) + \quad (1.3)$$
$$P_{i-8,i+1} \cdot D_{i+1}(o_{i-8}, o_{i+1}^3) + P_{i-12,i+1} \cdot D(o_{i-12}, o_{i+1}^4)$$

assuming that $P_{i,j}$ is the probability that the coding frame $f_i$ is referenced by the coding frame $f_j$, $o_i$ is the coding parameter of $B_i$. The last three terms are irrelevant to the coding parameter $o_i$ of $B_i$, so the formula (1.3) may be simplified as:

$$E(D_{i+1}) = P_{i,i+1} \cdot D_{i+1}(o_i, o_{i+1}^1) + a_{i+1} \quad (1.4)$$

In the same way, the expected distortion of the coding unit $B_{i+2}$ may be written as:

$$E(D_{i+2}) = P_{i,j+2} \cdot D_{i+2}(o_i, o_{i+2}^2) + P_{i+1,i+2} \cdot D_{i+2}(o_i, o_{i+1}^*, o_{i+2}^1) + a_{i+2} \quad (1.5)$$

wherein $a_{i+2} = P_{i-4,i+2} \cdot D_{i+2}(o_{i-4}, o_{i+2}^3) + P_{i-8,i+2} \cdot D_{i+2}(o_{i-8}, o_{i+2}^4)$ is irrelevant to the coding parameter $o_i$ of $B_i$, and the expected distortion of the coding unit which will affect the subsequent coding unit may be obtained by the similar method.

Based on the concept of the expected distortion, the rate distortion problem of the formula (1.2) may be represented again as:

$$\min_{o_i} \sum_{j=i}^{N} E(D_j) + \lambda_g R_i(o_i) \quad (1.6)$$

The algorithm is relative rough to the expected distortion estimated by the current coding unit and the subsequent coding unit, so it is difficult for the propagation factor to accurately measure the influence on the subsequent coding distortion by the distortion of the current coding unit, and a loss is generated in the new generation video coding standard VCC; and meanwhile, the algorithm does not perform temporal domain rate distortion optimization on the I frame, and the coding performance of the I frame is very important in the LD coding structure.

SUMMARY

For the above problem, in order to further optimize the temporal domain rate distortion optimization solution under the LD coding structure, the problem of dependency rate distortion optimization based on temporal domain distortion propagation is induced again according to a temporal domain dependency relationship under an LD structure and distortion propagation analysis under the skip mode and the inter mode; and the aggregation distortion of a current coding unit and an affected future coding unit are estimated and a propagation factor of a coding unit in a temporal domain distortion propagation model is calculated by constructing a temporal domain distortion propagation chain, so that a Lagrange multiplier is adjusted through a more accurate propagation factor to realize temporal domain dependency rate distortion optimization, and an I frame is subjected to a secondary coding technology to realize temporal domain dependency rate distortion optimization of the I frame.

The present invention adopts the following technical solutions:

The reconstruction distortion of a coding unit $B_i$ is assumed to be $D_i$. Due to the presence of a skip mode in inter-frame prediction, it is unnecessary to transmit residual error in this mode, an inter-frame prediction value is directly used as a reconstruction value, and it is necessary to transmit residual error in another mode which is called an inter mode; therefore, the distortion of the current coding unit may consist of distortions brought by the skip mode and the inter mode:

$$D_i = p^{inter} \cdot D_i^{inter} + p^{skip} \cdot D_i^{skip} = d^{inter} + d^{skip} \quad (1.7)$$

Only the partial distortion $d_{inter}$ of the current coding unit in the inter mode will affect the subsequent coding unit, because it is unnecessary to transmit a predicted residual error when the coded reference unit serves as a prediction block in the skip mode. The distortion of the current coding unit is determined by the distortion of the previously coded reference unit, so the influence on the subsequent coding unit is determined by the previously coded unit, and the distortion in the skip mode should be eliminated when the influence on the subsequent coding unit by the current coding unit is considered. Assuming that $D_i^{inter}$ and $D_i^{skip}$ are coding distortions of the current coding unit selecting the inter mode and the skip mode respectively, $p^{inter}$ and $p^{skip}$ are the probabilities that the current coding unit selects the inter mode and the slip mode respectively, and the sum of the two is 1. The larger error between the current coding unit and the prediction unit will cause larger probability that an encoder selects the inter mode, and the larger quantification step size will increase the probability that the encoder selects the skip mode. Therefore, $p^{inter}$ is defined as:

$$p^{inter} = \frac{12 D_i^{OMCP}}{12 D_i^{OMCP} + \Delta^2} \quad (1.8)$$

wherein $D_i^{OMCP} = \|F_i - F_{i-1}\|^2$ is an original motion compensation error obtained by $B_i$ in an original frame through motion search, $F_i$ and $F_{i-1}$ represents original pixels of a coding unit $B_i$ and a reference unit $B_{i-1}$ respectively, and $\Delta$ is quantification step size.

when $B_i$ is coded, a partial derivative of a formula (1.6) with respect to Ri is evaluated to obtain a global Lagrange multiplier $\lambda_g$:

$$\lambda_g = -\frac{\partial \sum_{j=i}^{N} E(D_j)}{\partial R_i} \quad (1.9)$$

A $\partial R_i / \partial D_i$ is multiplied at both ends of the formula (1.9) and assuming that $\partial D_i / \partial R_i = \lambda_i$, it may be obtained as follows:

$$\lambda_i = \lambda_g \bigg/ \left(1 + \frac{\partial \sum_{j=i+1}^{N} E(D_j)}{\partial D_i}\right) = \frac{\lambda_g}{1 + \kappa_i} \quad (1\text{-}10)$$

wherein is a Lagrange multiplier of the coding unit $B_i$ under the global rate distortion performance. In addition, $\kappa_i$ represents the influence on the subsequent video sequence coding distortion by the coding unit $B_i$, which is called a propagation factor of the coding unit $B_i$.

The distortion function under the inter mode with high code rate may be represented as $D_{i+1}^{inter} = e^{-bR_{i+1}} \cdot D_{i+1}^{MCP}$, the distortion function under the skip mode may be represented as $D_{i+1}^{inter} = D_{i+1}^{MCP}$, $R_{i+1}$ is a code rate, b is a constant relevant to information source distribution, and $D_{i+1}^{MCP}$ is a motion compensation prediction error of $B_{i+1}$.

$$\begin{aligned} D_{i+1}^{MCP} &= \|F_{i+1} - \hat{F}_i\|^2 \\ &\approx \alpha \cdot (\|F_{i+1} - F_i\|^2 + \|F_i - \hat{F}_i\|^2) \\ &\approx \alpha \cdot (D_{i+1}^{OMCP} + D_i) \end{aligned} \quad (1.11)$$

$F_i$ represents an original pixel of the coding unit $B_i$, $\hat{F}_i$ represents a reconstruction pixel of the coding unit $B_i$ and $F_{i+1}$ represents an original pixel of the coding unit $B_{i+1}$.

According to the experimental observation, a is about equal to a constant, and at this time, the distortion of the coding unit $B_{i+1}$ may be represented as:

$$D_{i+1} \approx p_{i,i+1}^{inter} \cdot e^{-bR_{i+1}} \cdot \alpha \cdot (D_{i+1}^{OMCP} + D_i) + p_{i,i+1}^{skip} \cdot \alpha \cdot (D_{i+1}^{OMCP} + D_i) \quad (1\text{-}12)$$

wherein $P_{i,i+1}^{inter}$ and $P_{i,i+1}^{skip}$ represent the probabilities of using the inter mode and the skip mode when the coding unit $B_{i+1}$ is referenced to the coding unit $B_i$, and $D_{i+1}^{OMCP}$ represents an original motion compensation error of the coding unit $B_{i+1}$.

At this time, the expected distortion of the coding unit $B_{i+1}$ affected by the coding unit $B_i$ in the coding frame $f_{i+1}$ may be obtained by a formula (1.4) and a formula (1.7):

$$\begin{aligned}E(D_{i+1}) &= P_{i,i+1} \cdot \left( p_{i,i+1}^{inter} e^{-bR_{i+1}} \alpha \cdot (D_{i+1}^{OMCP} + D_i) + p_{i,i+1}^{skip} \alpha \cdot (D_{i+1}^{OMCP} + D_i) \right) + \\ &\quad a_{i+1} \\ &= P_{i,i+1} \alpha \cdot \left( p_{i,i+1}^{inter} e^{-bR_{i+1}} + p_{i,i+1}^{skip} \right) \cdot D_i^{inter} + c_{i+1} \\ &= P_{i,i+1} \gamma_{i+1} D_i^{inter} + c_{i+1} \end{aligned} \quad (1.13)$$

Wherein $\gamma_{i,i+1} = \alpha \cdot (p_{i,i+1}^{inter} \cdot e^{-bR_{i+1}} + p_{i,i+1}^{skip})$, $e^{-bR_{i+1}}$ is only relevant to the code rate $R_{i+1}$ of the coding unit $B_{i+1}$ and is irrelevant to the coding parameter $o_i$ of the coding unit $B_i$, $c_{i+1} = P_{i,i+1} \cdot (p_{i,i+1}^{inter} \cdot e^{-bR_{i+1}} \cdot \alpha \cdot (D_{i+1}^{OMCP} + D_i^{skip}) + p_{i,i+1}^{skip} \cdot \alpha \cdot (D_{i+1}^{OMCP} + D_i^{skip})) + a_{i+1}$ is also irrelevant to the coding parameter $o_i$ of $B_i$, and only the probability $P_{i,i+1}$ that the coding frame $f_i$ is referenced by the coding frame $f_{i+1}$, the coding distortion $D_i^{inter}$ of the coding unit $B_i$ in the inter mode and the parameter $\gamma_{i,i+1}$ are relevant to the coding parameter $o_i$.

In the same way, the expected distortion of the coding unit $B_{i+2}$ affected by $B_i$ in the coding frame $f_{i+2}$ is:

$$E(D_{i+2}) = (P_{i+1,i+2} \gamma_{i+1,i+2} \cdot P_{i,i+1} \gamma_{i,i+1} + P_{i,i+2} \gamma_{i,i+2}) \cdot D_i^{inter} + c_{i+2} \quad (1\text{-}14)$$

wherein $\gamma_{i+1,i+2} = \alpha \cdot (p_{i+1,i+2}^{inter} \cdot e^{-bR_{i+2}} + p_{i+1,i+2}^{skip})$, wherein $p_{i+1,i+2}^{inter}$ and $p_{i+1,i+2}^{skip}$ represent the probabilities of using the inter mode and the skip mode when the coding unit $B_{i+2}$ is referenced to the coding unit $B_{i+1}$ respectively, $\gamma_{i,i+2} = \alpha \cdot (p_{i,i+2}^{inter} \cdot e^{-bR_{i+2}} + p_{i,i+2}^{skip})$, wherein $p_{i,i+2}^{inter}$ and $p_{i,i+2}^{skip}$ represent the probabilities of using the inter mode and the skip mode when the coding unit $B_{i+2}$ is referenced to the coding unit $B_i$ respectively, $R_{i+2}$ represents the code rate of the coding unit $B_{i+2}$, $P_{i+1,i+2}$ and $P_{i,i+2}$ represent the probabilities that the coding frames $f_{i+1}$ and $f_i$ are referenced by the coding frame $f_{i+2}$ respectively. $c_{i+2}$ is an irrelevant term irrelevant to the coding parameter $o_i$ of the coding unit $B_i$.

In the same way, the expected distortion of the coding unit $B_{i+3}$ affected by $B_i$ in the coding frame $f_{i+3}$ is:

$$\begin{aligned}E(D_{i+3}) &= (P_{i,i+1} \cdot \gamma_{i,i+1} \cdot P_{i+1,i+2} \cdot \gamma_{i+1,i+2} \cdot P_{i+2,i+3} \cdot \gamma_{i+2,i+3} + \\ &\quad P_{i,i+2} \cdot \gamma_{i,i+2} \cdot P_{i+2,i+3} \cdot \gamma_{i+2,i+3} + P_{i,i+3} \cdot \gamma_{i,i+3}) \cdot D_i^{inter} + c_{i+3}\end{aligned} \quad (1\text{-}15)$$

wherein $\gamma_{i+2,i+3} = \alpha \cdot (p_{i+2,i+3}^{inter} \cdot e^{-bR_{i+3}} + p_{i+2,i+3}^{skip})$, wherein $P_{i+2,i+3}^{inter}$ and $p_{i+2,i+3}^{skip}$ represent the probabilities of using the inter mode and the skip mode when the coding unit $B_{i+3}$ is referenced to the coding unit $B_{i+2}$ respectively, $\gamma_{i,i+3} = \alpha \cdot (p_{i,i+3}^{inter} \cdot e^{-bR_{i+3}} + p_{i,i+3}^{skip})$, wherein $p_{i,i+3}^{inter}$ and $p_{i,i+3}^{skip}$ represent the probabilities of using the inter mode and the skip mode when the coding unit $B_{i+3}$ is referenced to the coding unit $B_i$ respectively, $R_{i+3}$ represents the code rate of the coding unit $B_{i+3}$, $P_{i+2,i+3}$ and $P_{i,i+3}$ represent the probabilities that the coding frames $f_{i+2}$ and $f_i$ are referenced by the coding frame $f_{i+3}$ respectively. $c_{i+3}$ is an irrelevant term irrelevant to the coding parameter $o_i$ of the coding unit $B_i$.

Therefore, the aggregation distortion of all the coding units influenced by the coding unit B in four coding frames in the current GOP is:

$$\sum_{k=0}^{3} E(D_{i+k+1}) = \quad (1\text{-}16)$$

$$\sum_{k=0}^{3} \left( \sum_{i=0}^{k} P_{i,i+k+1-i} \cdot \gamma_{i,i+k+1-i} \prod_{j=i+k+1-i}^{i+k} P_{j,j+1} \cdot \gamma_{j,j+1} \right) \cdot D_i^{inter} + L_i$$

wherein $\gamma_{i,i+k+1-t} = \alpha \cdot (p_{i,i+k+1-t}^{inter} \cdot e^{-bR_{i,i+k+1-t}} + p_{i,i+k+1-t}^{skip})$, wherein $p_{i,i+k+1-t}^{inter}$ and $p_{i,i+k+1-t}^{skip}$ represent the probabilities of using the inter mode and the skip mode when the coding unit $B_{i+k+1-t}$ is referenced to the coding unit $B_i$ respectively, $\gamma_{j,j+1} = \alpha \cdot (p_{j,j+1}^{inter} \cdot e^{-bR_{j+1}} + p_{j,j+1}^{skip})$, wherein $p_{j,j+1}^{inter}$ and $p_{j,j+1}^{skip}$ represent the probabilities of using the inter mode and the skip mode when the coding unit $B_{j+1}$ is referenced to the coding unit $B_j$ respectively, $P_{i,i+k+1-t}$ represents a probability that the coding frame $f_i$ is referenced by the coding frame $f_{i+k+1-t}$, and $P_{i,i+1}$ represents a probability that the coding frame $f_j$ is referenced by the coding unit $f_{j+1}$, $$L_i = \sum_{k=0}^{3} c_{i+k-1}$$

being irrelevant to the coding parameter $o_i$ of the coding unit $B_i$.

In the same way, the aggregation distortion of all the coding units influenced by the coding unit $B_i$ in four coding frames in the m-th GOP is:

$$\sum_{k=0}^{3} E(D_{i+4m+k+1}) = \quad (1.17)$$

$$\left\{ \sum_{k=0}^{3} \left( \sum_{i=0}^{k} P_{i+4m,i+4m+k+1-i} \cdot \gamma_{i+4n,j+4m+k+1-i} \prod_{j=i+4m+k+1-i}^{i+4m+k} P_{j,j+1} \cdot \gamma_{j,j+1} \right) \cdot \right.$$

$$\left. \prod_{s=0}^{m-1} \left( \sum_{i=0}^{3} P_{i+4s,i+4s+4-i} \cdot \gamma_{i+4s,i+4s+4-i} \prod_{j=i+4s+4-i}^{i+4s+3} P_{j,j+1} \cdot \gamma_{j,j+1} \right) \right\}$$

$$D_i^{inter} + L_{4m}$$

$\gamma_{i+4m,j+4m+k+1-t} = \alpha \cdot (p_{i+4m,i+4m+k+1-t}^{inter} \cdot e^{-bR_{i+4m+k+1-t}} + p_{i+4m,i+4m+k+1-t}^{skip})$, wherein $p_{i+4m,i+4m+k+1-t}^{inter}$ and $p_{i+4m,i+4m+k+1-t}^{skip}$ represent the probabilities of using the inter mode and the skip mode when the coding unit $B_{i+4m+k+1-t}$ is referenced to the coding unit $B_{i+4m}$ respectively, $P_{i+4m,i+4m+k+1-t}$ represents a probability that the coding frame $f_{i+4m}$ is referenced by the coding frame $f_{i+4m+k+1-1}$, and $P_{j,j+1}$ represents a probability that the coding frame $f_j$ is referenced by the coding frame $f_{j+1}$, $$L_{4m} = \sum_{k=0}^{3} c_{i+4m+k+1}$$

being irrelevant to the coding parameter $o_i$ of the coding unit $B_i$.

The aggregation distortion of the coding units affected by $B_i$ in all the subsequent coding frames from the coding frame $f_{i+1}$ to the last coding frame $f_N$ is:

$$\sum_{j=i+1}^{N} E(D_j) = L + \sum_{m=0}^{M} \left\{ \sum_{k=0}^{3}\left(\sum_{i=0}^{k} P_{i+4m,i+4m+k+1-i} \cdot \gamma_{i+4m,i+4m+k+1-i} \prod_{j=i+4m+k+1-i}^{i+4m+k} P_{j,j+1} \cdot \gamma_{j,j+1}\right) \cdot \atop \prod_{s=0}^{m-1}\left(\sum_{i=0}^{3} P_{i+4s,i+4s+4-i} \cdot \gamma_{i+4s,i+4s+4-i} \prod_{j=i+4s+4-i}^{i+4s+3} P_{j,j+1} \cdot \gamma_{j,j+1}\right) \right\} \cdot D_i^{inter} \quad (1.18)$$

wherein M is a total number of the GOP from the coding frame $f_{i+1}$ to the last coding frame $f_N$, and L represents an item irrelevant to $o_i$.

It may be seen from a formula (1.8) that a relationship between the coding distortion $D_i^{inter}$ of the current coding unit $B_i$ using the inter mode and the actual coding distortion $D_i$ is as follows:

$$D_i^{inter} = \frac{e^{-bR_i}}{1 + (e^{-bR_i} - 1)p_i^{inter}} \quad (1\text{-}19)$$

making $$\frac{e^{-bR_i}}{1 + (e^{-bR_i} - 1)p_i^{inter}} = \eta_i, \ p_i^{inter}$$

being the probability of the coding unit $B_i$ selecting the inter mode, and a formula (1.19) may be represented as: $D_i^{inter} = \eta_i D_i$.

According to a formula (1.10), the calculation formula of the propagation factor $\kappa_i$ is:

$$\kappa_i = \frac{\partial \sum_{j=i+1}^{N} E(D_j)}{\partial D_i} = \quad (1\text{-}20)$$

$$\eta_i \sum_{m=0}^{M} \left\{ \sum_{k=0}^{3}\left(\sum_{t=0}^{k} P_{i+4m,i+4m+k+1-t} \cdot \atop \gamma_{i+4m,i+4m+k+1-t} \prod_{j=i+4m+k+1-t}^{i+4m+k} P_{j,j+1} \cdot \gamma_{j,j+1}\right) \cdot \atop \prod_{z=0}^{m-1}\left(\sum_{t=0}^{3} P_{i+4s,i+4z+4-t} \cdot \gamma_{i+4z,i+4s+4-t} \prod_{j=i+4z+4-t}^{i+4z+3} P_{j,j+1} \cdot \gamma_{j,j+1}\right) \right\}$$

the CTU-level global Lagrange multiplier $\lambda_g$ may be adaptively adjusted by using the propagation factor $\kappa_i$, the CTU-level QP is further adjusted, and the frame level QP of all the B frames is adjusted by using a frame level average propagation factor.

Since the I frame is particularly important under the LD coding structure, and the subsequent coding frames need to be referenced to the I frame. At present, the QP of the I frame is uniformly lowered by 1 in the VTM, but the importance of the I frame is different in different sequences, so the I frame may be coded twice, the distortion propagation chain is established by the coding distortion obtained by the first coding, the propagation factor of each 16×16 block in the I frame is calculated, and the QP of the I frame is adjusted by the frame level average propagation factor, so that the QP of the I frame may be adjusted according to the influence on the subsequent coding frame by the I frame and the adjustment value is not limited to −1.

The present invention has the following beneficial effects: the problem in the traditional method that the I frame is not subjected to temporal domain rate distortion optimization is solved, so that the global rate distortion performance of the I frame is optimal, the problem of dependent rate distortion optimization based on temporal domain distortion propagation is induced again according to the temporal domain dependent relationship under the LD coding structure and the distortion propagation analysis in the skip mode and the inter mode, and the rate distortion optimization performance under the LD coding structure is improved.

DETAILED DESCRIPTION OF THE EMBODIMENTS

Figure 1:
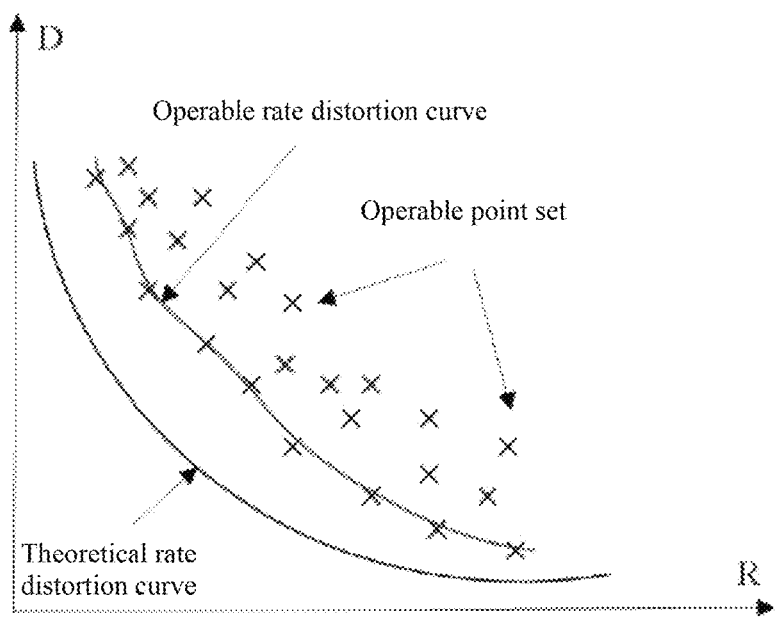
FIG. 1 is an operable rate distortion curve.
Figure 2:
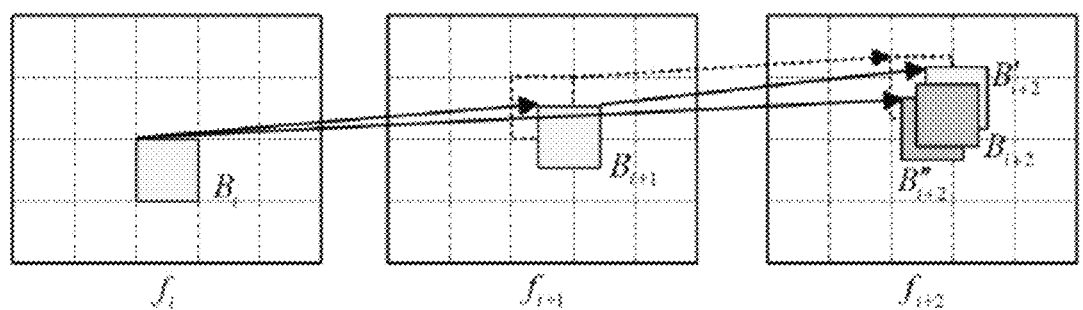
FIG. 2 is a construction schematic diagram of a temporal domain distortion propagation chain under an LD coding structure.
Figure 3:
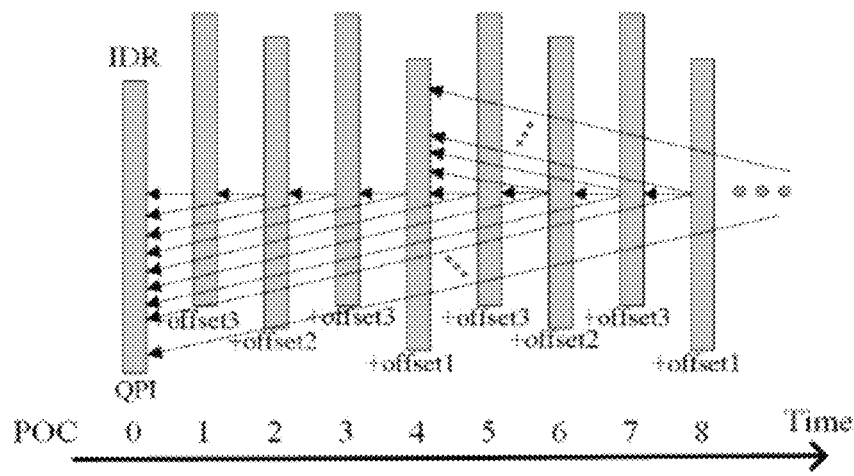
FIG. 3 is a schematic diagram of an LD coding structure.

The present invention is described in detail below with reference to the embodiments:

in order to simplify the implementation method of a global rate distortion algorithm, a global Lagrange multiplier $\lambda_g$ may be directly modified in VTM through a propagation factor $\kappa_i$. The subsequent coding unit is not really coded when deducing a propagation factor $\kappa_i$, so it is necessary to estimate the distortion of the subsequent coding unit.

Under the condition of high code rate, the large probability of the coding distortion of the subsequent coding unit is inter distortion, and at this time, $D_{i+1} = e^{-bR_{i+1}} \cdot D_{i+1}^{MCP}$ is present. Since $B_{i+1}$ is not coded, $R_{i+1}$ cannot be obtained and $D_{i+1}$ cannot use (1.21) calculation, but the coding distortion of $B_{i+1}$ may be represented as $D_{i+1}=D_{i+1}^{MCP} \cdot F(\theta)$ in case that the quantification step size is $Q_{step}$, $$F(\theta)=D_{i+1}/D_{i+1}^{MCP}=e^{-bR_{i+1}} \quad (1\text{-}21)$$

wherein $\theta=\sqrt{2}Q_{step}/\sqrt{D^{MCP}}$, a $F(\theta)$ curve may be fit based on a large amount of experiments with different quantification step sizes and coding units, a query table is established according to the curve, and the value of $F(\theta)$ is queried by calculating $\theta$, so that the inter distortion of the coding block is estimated; meanwhile, in the present invention, $\alpha$ is set as 0.94.

According to the formula (1-9), a global Lagrange multiplier may be obtained:

$$\lambda_g = -\frac{(1+\kappa_i)\partial D_i}{\partial R_i} \quad (1\text{-}22)$$
$$= (1+\kappa_i)b \cdot e^{-bR_i} \cdot D_i^{MCP}$$
$$= (1+\kappa_i)b \cdot D_i$$

Meanwhile, the Lagrange multiplier $\lambda_{VTM}=-\partial D_i^{VTM}/\partial R_i^{VTM}=bD_i^{VTM}$ of VTM. Therefore, $\lambda_g$ and $\lambda_{VTM}$ have the following relationship:

$$D_i \cdot \lambda_g = (1+\kappa_i)D_i^{VTM} \cdot \lambda_{VTM} \quad (1\text{-}23)$$

For all the coding units, there is:

$$\lambda_g = \frac{\sum_{i=1}^{N}(1+\kappa_i)D_i^{VTM}}{\sum_{i=1}^{N}D_i} \cdot \lambda_{VTM} \quad (1\text{-}24)$$

The global Lagrange multiplier $\lambda_g$ may be evaluated by a formula (1-24), wherein N is the number of all the coding units, the distortion of all the coding units cannot be obtained in the coding process, and $\lambda_g$ is updated by the weighted sum of the distortion at this time, the distortion of the coded frame and the distortion of the coding frame which is just completed. Since $D_i^{VTM}$ cannot be obtained in an encoder which integrates with the rate distortion algorithm proposed in this section, $D_i$ is used for replacing.

When the distortion propagation chain is established, motion search is done based on a 16×16 block, and a propagation factor of each block is calculated. The CTU of 128-128 is independently divided and coded in the VTM, so the average value of the propagation factors in all the 16×16 blocks in the CTU is taken as the propagation factor of the CTU, and the CTU-level Lagrange multiplier and the QP are adjusted; meanwhile, the QP of the frame level is adjusted by using the average propagation factor of a whole image.

The I frame is coded for twice to optimize and adjust the QP of the I frame. In order to reduce the coding complexity, the first coding process of the I frame is optimized, binary tree and ternary tree division modes are skipped, the CTU is divided only by a quad tree division mode, the minimum dividing size of the coding unit is set as 16×16 without smaller size division, and the distortion obtained based on the first coding of the I frame may estimate the influence on the subsequent coding unit by the distortion of the coding unit at the I frame, thereby realizing adaptive adjustment of the QP of the I frame.

According to the present invention, VVC reference software VTM5.0 serves as an experimental platform, the experimental environment is configured according to the common test conditions (CTC) specified by JVET and the reference software, the experiment is only performed under an LDB coding structure, the experiment test sequences are 16 video sequences such as Class B, C, D and E suggested by CTC, and each test sequence uses four QP points (22, 27, 32 and 37) for coding.

TABLE 1

The test result of the present invention compared with VTM5.0

| Class | Sequence name | Resolution rate | BD-rate(%) | | |
|---|---|---|---|---|---|
| | | | Y | U | V |
| B | MarketPlace | 1080P | −1.59 | −1.62 | −2.46 |
| | RitualDance | 1920 × 1080 | 0.59 | 2.68 | 1.69 |
| | Cactus | | −4.00 | −4.39 | −3.29 |
| | BasketballDriv | | 0.49 | 2.48 | 1.78 |
| | BQTerrace | | 0.43 | 0.30 | −3.65 |
| | Average | | −0.82 | −0.11 | −1.19 |
| C | BasketballDril | WVGA | −3.44 | −5.66 | −3.67 |
| | BQMall | 832 × 480 | 0.12 | 0.93 | 1.53 |
| | PartyScene | | −1.28 | −1.10 | −1.69 |
| | RaceHorses | | 0.59 | 2.44 | 1.76 |
| | Average | | −1.00 | −0.85 | −0.49 |
| D | BasketballPass | WQVGA | −1.21 | −1.65 | −0.50 |
| | BQSquare | 416 × 240 | −0.77 | −12.12 | −7.98 |
| | BlowingBubbles | | −0.64 | −1.63 | −1.98 |
| | RaceHorses | | 0.02 | 0.98 | 1.04 |
| | Average | | −0.65 | −3.60 | −2.36 |
| E | FourPeople | 720P | −10.26 | −27.59 | −25.08 |
| | Johnny | 1280 × 720 | −8.81 | −40.33 | −34.66 |
| | KristenAndSara | | −11.33 | −34.98 | 29.93 |
| | Average | | −10.13 | −34.30 | −29.89 |
| | Overall | | −2.57 | −7.58 | −6.69 |

Figure 4:
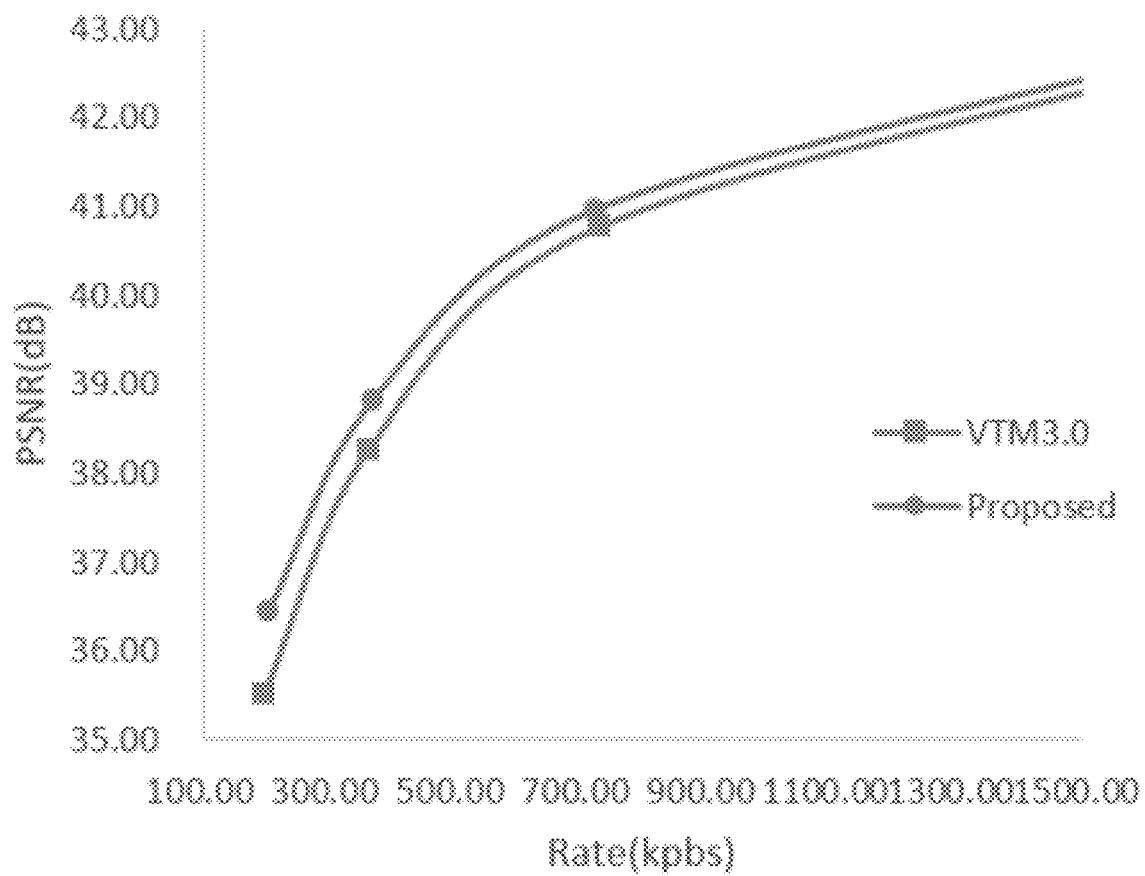
FIG. 4 is a rate distortion curve diagram of a Fourpeople sequence.

The coding experimental result is shown in Table 1. The table shows the Y component of the test sequence under the LDB coding structure achieves 2.57% coding performance. For most test sequences, the performance of the present invention is obviously improved, especially for Class E, the performance is obviously improved, and 10.13% code rate is saved under the Y component. The main reason is that Class E is a video sequence with a relatively fixed scene, each video frame has high similarity and high temporal domain dependence, and the present invention can achieve a better effect for the sequence. Then, some sequences are selected, a curve comparison diagram is optimized on the basis of the rate distortion, and the improvement condition of the coding performance of the sequences is observed. As shown in FIG. 4 which is a rate distortion curve diagram of a Fourpeople sequence, wherein the x-coordinate is the code rate, the y-coordinate is reconstructed peak signal to noise ratio (PSNR), the circular marking curve is a rate distortion curve of the global rate distortion optimization algorithm, and the square marking curve is a rate distortion curve of the original VTM5.0. It may be seen that for the sequence with strong temporal domain dependence, the coding efficiency of the algorithm is obviously improved.

Similarly, in the aspect of the coding complexity, the coding complexity of the temporal domain rate distortion optimization algorithm under the LDB coding structure is averagely increased by 15%, which is mainly due to that it takes a certain amount of time to do motion search on each 16×16 block to find the affected coding block so as to establish the distortion propagation chain; meanwhile, the I frame is optimized through 2-pass coding. Although the first coding process of the I frame is simplified, a small amount of coding complexity is increased.

TABLE 2

The coding time percentage of the present invention compared with VTM5.0

| | Sequence | | | | |
|---|---|---|---|---|---|
| Configuration | Class B | Class C | Class D | Class E | Overall average ΔEncT |
| LDB | 100% | 115% | 143% | 111% | 115% |

What is claimed is:

1. A temporal domain rate distortion optimization method considering a coding-mode adaptive distortion propagation, comprising the following steps:

S1: defining a reconstruction distortion D of a coding unit $B_i$ as:

$$D_i = p^{inter} \cdot D_i^{inter} + p^{skip} \cdot D_i^{skip} = d^{inter} + d^{skip};$$

wherein $D_i^{inter}$ and $D_i^{skip}$ are coding distortions of a current coding unit selecting an inter mode and a skip mode respectively, $p^{inter}$ and $p^{skip}$ are probabilities of the current coding unit selecting the inter mode and the skip mode respectively, $d^{inter}$ is a first partial distortion under the inter mode, $d^{skip}$ is a second partial distortion under the skip mode, $p^{inter} + p^{skip} = 1$;

defining $p^{inter}$ as:

$$p^{inter} = \frac{12 D_i^{OMCP}}{12 D_i^{OMCP} + \Delta^2}; \quad (1)$$

wherein $D_i^{OMCP} = \|F_i - F_{i-1}\|^2$ is an original motion compensation error obtained by the coding unit $B_i$ in an original frame through a motion search, $F_i$ and $F_{i-1}$ represents original pixels of the coding unit $B_i$ and a reference unit $B_{i-1}$ respectively, and $\Delta$ is a quantified step size;

S2: when coding the coding unit $B_i$, evaluating a partial derivative on a $B_i$ temporal domain dependency rate distortion optimization problem $$\min_{o_i} \sum_{j=i}^{N} E(D_j) + \lambda_g R_i(o_i)$$

with respect to $R_i$ to obtain a global Lagrange multiplier $\lambda_g$:

$$\lambda_g = -\frac{\partial \sum_{j=i}^{N} E(D_j)}{\partial R_i}; \quad (2)$$

wherein $o_i$ is a coding parameter of the coding unit Bi and $R_i$ represents a bit number of the coding unit Bi;

multiplying a $\partial R_i / \partial D_i$ at both ends of formula (2) and making $\partial D_i / \partial R_i = -\lambda_i$ to obtain:

$$\lambda_i = \lambda_g \Big/ \left(1 + \frac{\partial \sum_{j=i+1}^{N} E(D_j)}{\partial D_i}\right) = \frac{\lambda_g}{1 + \kappa_i}; \quad (3)$$

wherein $\lambda_i$ is a Lagrange multiplier of the coding unit $B_i$ under a global rate distortion performance, and $\kappa_i$ represents an influence of the coding unit $B_i$ on a subsequent video sequence coding distortion and is defined as a propagation factor of the coding unit $B_i$;

S3: establishing an aggregation distortion of coding units influenced by the coding unit $B_i$ in four coding frames in a current group of pictures (GOP):

$$\sum_{k=0}^{3} E(D_{i+k+1}) = \quad (4)$$

$$\sum_{k=0}^{3} \left( \sum_{i=0}^{k} P_{i,i+k+1-t} \cdot \gamma_{i,i+k+1-t} \prod_{j=i+k+1-t}^{i+k} P_{j,j+1} \cdot \gamma_{j,j+1} \right) \cdot D_i^{inter} + L_i;$$

wherein $\gamma_{i,i+k+1-t} = \alpha \cdot (p_{i,i+k+1-t}^{inter} \cdot e^{-bR_{i,i+k+1-t}} + p_{i,i+k+1-t}^{skip})$ $\alpha$ is a constant, $P_{i,i+k+1-t}^{inter}$ and $P_{i,i+k+1-t}^{skip}$ respectively represent probabilities of using the inter mode and the skip mode when a coding unit $B_{i+k+1-t}$ is referenced to the coding unit $B_i$, $\gamma_{j,j+1} = \alpha \cdot (p_{j,j+1}^{inter} \cdot e^{-bR_{j+1}} + p_{j,j+1}^{skip})$, wherein $P_{j,j+1}^{inter}$ and $P_{j,j+1}^{skip}$ represent probabilities of using the inter mode and the skip mode when the coding unit $B_{j+1}$ is referenced to the coding unit $B_j$, $P_{i,i+k+1-t}$ represents a probability that the coding frame $f_i$ is referenced by the coding frame $f_{i+k+1-t}$, and $P_{i,i+1}$ represents a probability that the coding frame $f_j$ is referenced by the coding unit $f_{j+1}$, and $$L_i = \sum_{k=0}^{3} c_{i+k+1}$$

is irrelevant to the coding parameter $o_i$ of the coding unit $B_i$, wherein $c_{i+k+1}$ is an irrelevant item that is irrelevant to the coding parameter $o_i$ of the coding unit $B_i$;

establishing the aggregation distortion of the coding units influenced by the coding unit $B_i$ in the four coding frames in an m-th GOP:

$$\sum_{k=0}^{3} E(D_{i+4m+k+1}) = \quad (5)$$

$$\left\{ \sum_{k=0}^{3} \left( \sum_{t=0}^{k} P_{i+4m,i+4m+k+1-t} \cdot \gamma_{i+4n,i+4m+k+1-t} \prod_{j=i+4m+k+1-t}^{i+4m+k} P_{j,j+1} \cdot \gamma_{j,j+1} \right) \cdot \prod_{s=0}^{m-1} \left( \sum_{t=0}^{3} P_{i+4s,i+4s+4-t} \cdot \gamma_{i+4s,j+4s+4-t} \prod_{j=i+4s+4-t}^{i+4s+3} P_{j,j+1} \cdot \gamma_{j,j+1} \right) \right\} D_i^{inter} + L_{4m};$$

wherein $\gamma_{i+4m,j+4m+k+1-t} = \alpha \cdot (p_{i+4m,i+4m+k+1-t}^{inter} \cdot e^{-bR_{i+4m+k+1-t}} + p_{i+4m,i+4m+k+1-t}^{skip})$, $P_{i+4m,i+4m+k+1-t}^{inter}$ and $P_{i+4m,i+4m+k+1-t}^{skip}$ respectively represent probabilities of using the inter mode and the skip mode when a coding unit $B_{i+4m+k}$ is referenced to a coding unit $B_{i+4m}$, $P_{i+4m,i+4m+k+1-t}$ represents a probability that a coding frame $f_{i+4m}$ is referenced by a coding frame $f_{i+4m+k+1-t}$, $P_{j,j+1}$ represents a probability that the coding frame $f_j$ is referenced by the coding frame $f_{j+1}$, and $$L_{4m} = \sum_{k=0}^{3} c_{i+4m+k+1}$$

is irrelevant to the coding parameter $o_i$ of the coding unit $B_i$, wherein $c_{i+4m+k+1}$ is an irrelevant item irrelevant to the coding parameter $o_i$ of the coding unit $B_i$;

obtaining the aggregation distortion of the coding units affected by the coding unit $B_i$ in subsequent coding frames from a coding frame $f_{i+1}$ to a last coding frame $f_N$:

$$\sum_{j=i+1}^{N} E(D_j) = \qquad (6)$$

$$L + \sum_{m=0}^{M} \left\{ \begin{array}{c} \sum_{k=0}^{3} \left( \sum_{t=0}^{k} P_{i+4m,i+4m+k+1-t} \cdot \right. \\ \left. \gamma_{i+4m,i+4m+k+1-t} \prod_{j=i+4m+k+1-t}^{i+4m+k} P_{j,j+1} \cdot \gamma_{j,j+1} \right) \cdot \\ \prod_{s=0}^{m-1} \left( \sum_{t=0}^{3} P_{i+4s,i+4s+4-t} \cdot \gamma_{i+4s,i+4s+4-t} \right. \\ \left. \prod_{j=i+4s+4-t}^{i+4s+3} P_{j,j+1} \cdot \gamma_{j,j+1} \right) \end{array} \right\} D_i^{inter};$$

wherein M is a total number of a GOP from the coding frame $f_{i+1}$ to the last coding frame $f_N$, and L represents an item irrelevant to the coding parameter $o_i$; and S4: according to a definition of $p^{inter}$ in the step S1, obtaining a relationship between an inter distortion $D_i^{inter}$ of the current coding unit and the reconstruction distortion ID $$D_i^{inter} = \frac{e^{-bR_i} D_i}{1 + (e^{-bR_i} - 1) p_i^{inter}}; \qquad (7)$$

wherein b is a constant relevant to an information source distribution, making $$\frac{e^{-bR_i}}{1 + (e^{-bR_i} - 1) p_i^{inter}} = \eta_i,$$

and formula (7) is simplified and represented as $D_i^{inter} = \eta_i D_i$;

according to formula (3) in the step S2, obtaining a calculation formula of the propagation factor $\kappa_i$:

$$\kappa_i = \frac{\partial \sum_{j=i+1}^{N} E(D_j)}{\partial D_i} = \qquad (8)$$

$$\eta_i \sum_{m=0}^{M} \left\{ \begin{array}{c} \sum_{k=0}^{3} \left( \sum_{t=0}^{k} P_{i+4m,i+4m+k+1-t} \cdot \right. \\ \left. \gamma_{i+4m,i+4m+k+1-t} \prod_{j=i+4m+k+1-t}^{i+4m+k} P_{j,j+1} \cdot \gamma_{j,j+1} \right) \cdot \\ \prod_{s=0}^{m-1} \left( \sum_{t=0}^{3} P_{i+4s,i+4z+4-t} \cdot \gamma_{i+4z,i+4s+4-t} \right. \\ \left. \prod_{j=i+4z+4-t}^{i+4s+3} P_{j,j+1} \cdot \gamma_{j,j+1} \right) \end{array} \right\};$$

performing an adaptive adjustment on a coding tree unit (CTU)-level global Lagrange multiplier $\lambda_g$ by using the propagation factor $\kappa_i$, evaluating an average value of the propagation factor $\kappa_i$ for a CTU block according to the above-mentioned steps to obtain the propagation factor $\kappa_i$ of the CTU block, further adjusting a CTU-level QP, and adjusting frame-level QP of B frames by using a frame-level average propagation factor; and adopting a 2-pass coding mode for an I frame, establishing a distortion propagation chain by using a coding distortion obtained at a first coding, calculating the propagation factor $\kappa_i$ of each 16*16 block in the I frame according to the above step, and adjusting the frame-level QP of the I frame by using the frame-level average propagation factor, wherein the QP of the I frame is capable of adjusting influence of a subsequent coding frame according to the I frame.

* * * * *